United States Patent
Farnsworth et al.

(10) Patent No.: US 7,852,876 B2
(45) Date of Patent: Dec. 14, 2010

(54) APPARATUS, AND AN ASSOCIATED METHOD, FOR ROUTING DATA THROUGH LOGICAL LAYERS OF A COMMUNICATION DEVICE

(75) Inventors: Andrew John Farnsworth, Marlbrook (GB); Nicola M. Funnell, Coleshill (GB)

(73) Assignee: M-Stack Limited, Birmingham (GB)

( * ) Notice: Subject to any disclaimer, the term of this patent is extended or adjusted under 35 U.S.C. 154(b) by 1258 days.

(21) Appl. No.: 10/839,768

(22) Filed: May 5, 2004

(65) Prior Publication Data

US 2005/0249241 A1    Nov. 10, 2005

(51) Int. Cl.
*H04J 3/16*    (2006.01)

(52) U.S. Cl. ................................... 370/469

(58) Field of Classification Search .............. 370/328, 370/329, 338, 349, 351, 389, 392, 400, 401, 370/465, 466, 467, 469, 471, 474
See application file for complete search history.

(56) References Cited

U.S. PATENT DOCUMENTS

| | | | |
|---|---|---|---|
| 5,280,477 A * | 1/1994 | Trapp | 370/356 |
| 6,393,008 B1 * | 5/2002 | Cheng et al. | 370/338 |
| 6,862,276 B1 * | 3/2005 | Abrol et al. | 370/349 |
| 2003/0100309 A1 * | 5/2003 | Hull | 455/450 |
| 2004/0013102 A1 | 1/2004 | Fong et al. | |
| 2004/0057460 A1 | 3/2004 | Hwang | |
| 2004/0097267 A1 * | 5/2004 | Pecen et al. | 455/560 |
| 2004/0185860 A1 * | 9/2004 | Marjelund et al. | 455/450 |
| 2007/0133563 A1 * | 6/2007 | Hundscheidt et al. | 370/395.43 |
| 2007/0140491 A1 * | 6/2007 | Yi | 380/250 |
| 2008/0151805 A1 * | 6/2008 | Vayanos et al. | 370/312 |

FOREIGN PATENT DOCUMENTS

| | | |
|---|---|---|
| WO | WO 00/27154 | 5/2000 |
| WO | WO 03/096647 | 11/2003 |

\* cited by examiner

*Primary Examiner*—Kwang B Yao
*Assistant Examiner*—Kenan Cehic

(57) ABSTRACT

Apparatus, and an associated method, for routing data in a communication device defined in terms of a protocol stack. The protocol stack includes an upper logical layer, a lower logical layer, and a mid stack layer. A determiner determines the configuration of the radio bearer by which the data is to be communicated. If a determination is made that the radio bearer is configured such that it does not require its application to the mid stack layers, a data bypasser causes the data to bypass the mid stack layer. If, conversely, the data is to be applied to the mid stack layer, the data is caused to be routed therethrough.

18 Claims, 3 Drawing Sheets

APPARATUS, AND AN ASSOCIATED METHOD, FOR ROUTING DATA THROUGH LOGICAL LAYERS OF A COMMUNICATION DEVICE

The present invention relates generally to a manner by which to route data through a device, such as a mobile station or other device operable in a radio communication system, defined in terms of a protocol stack. More particularly, the present invention relates to apparatus, and an associated method, by which it is selectively possible to bypass one or more logical layers of the protocol stack when routing the data through the device.

When the data need not be applied to the logical layers, bypassing the logical layers reduces delays and reduces processing complexity otherwise required when passing the data through all of the logical layers of the device. Data that needs to be routed through the layers of the device is routed therethrough. And, data that need not be routed through the layers of the device is routed in a manner that bypasses intermediate layers of the device.

BACKGROUND OF THE INVENTION

Communication of data is an endemic aspect of modern society. Communication systems are utilized to allow the communication of the data. A communication system includes a sending station and a receiving station interconnected by way of a communication channel. Many different types of communication systems have been developed and deployed. Different types of communication systems are used to allow different communication services.

Many modern communication systems make use of digital communication techniques. Various advantages are inherent in the use of digital communication techniques in contrast to analog communication techniques. Digital communication techniques, for instance, improve the communication efficiency of the data. As a result of the increased communication efficiency, the communication capacity of a communication system that utilizes the digital communication techniques is correspondingly increased over the communication capacity of a corresponding communication system that utilizes only analog communication techniques.

A radio communication system is an exemplary type of communication system. In a radio communication system, the communication channel interconnecting sending and receiving stations is defined upon a radio air interface extending between the separate communication stations. The costs required initially to install and deploy a radio communication system are generally less than the corresponding costs associated with the installation and deployment of a wireline counterpart. Also, a radio communication system can be implemented as a mobile communication system, providing for mobility of communications.

A cellular communication system is an exemplary type of radio communication system. Cellular communication systems have achieved significant penetration, i.e., usage, levels. In some areas, for instance, the penetration level of cellular communication systems approach significant fractional levels of conventional wireline, telephonic systems. And, the network infrastructures of various cellular communication systems have been installed to encompass significant portions of the populated areas of the world. Successive generations of cellular communication systems have been developed and deployed.

So-called first generation (1G) cellular communication systems were first installed and generally utilize analog communication techniques. So-called, second generation (2G) cellular communication systems generally make use of digital communication techniques and provide for some data services. Third generation (3G) communication systems are undergoing development and deployment. Third-generation communication systems also utilize digital communication techniques and provide for data services. Data communicated pursuant to the effectuation of such data services is permitted to be communicated at higher data rates relative to data rates at which data is communicated in earlier generation systems. And, communication of data at selected, different communication rates is also generally permitted. Successor generation systems are presently under development, to be readied for future deployment.

Additionally, private access, and other, wireless communication systems that exhibit operational similarities to cellular communication systems have also been deployed. And, other such systems are under development. Wireless local area networks (WLANs), for instance, are used to communicate telephonically, typically when a user is positioned within a relatively defined geographical area, such as a building premises, or the like.

Communication devices, such as mobile stations, that operate in a radio communication system are sometimes defined in terms of logical layers, different ones of the logical layers performing different functions. A bottom layer is a physical layer, and a top layer is, e.g., an application layer at which application programs are resident. The logical layers are sometimes together referred to as a protocol stack. And, the protocol stack includes, typically, several mid-stack logical layers.

First-generation cellular communication systems utilize only circuit switched connections between communication stations operable therein. Second generation communication systems permit communications to be effectuated by the circuit switched connections and also by way of packet switched connections. And, successor generation communication systems also provide for packet switched connections by which to form communication connections between communication stations operable pursuant to a communication session to effectuate a communication service.

When circuit switched connections are formed, the functions provided by various of the mid stack layers of the communication device are not required. Passing the data therethrough, however, is conventionally undertaken in conventional communication devices. Passing the data that does not need to be operated upon at the mid stack layers introduces communication delay and increases the processing complexity of the communication device as the data is operated upon at the successive layers.

More generally, devices, formed of a protocol stack, that operate upon data might not always need to provide the data to every logical layer of the protocol stack.

If a manner could be provided by which to bypass application of the data to logical layers of the protocol stack to which the data need not be applied, then improved operation of the communication device would be permitted.

It is in light of this background information related to devices defined in terms of a protocol stack that the significant improvements of the present invention have evolved.

SUMMARY OF THE INVENTION

The present invention, accordingly, advantageously provides apparatus, and an associated method, by which to route data through a device, defined in terms of a protocol stack.

The device forms, for instance, a mobile station, or other entity, operable in a radio communication system.

Through operation of an embodiment of the present invention, a manner is provided by which it is possible to selectively bypass one or more logical layers of the protocol stack when routing data through the device. Data that need not be applied to a logical layer is caused to bypass the logical layer, thereby to reduce delays and to reduce processing complexity.

Data that needs to be routed through the layers of the device is routed threrethrough. And, data that need not be routed through all of the layers of the device are routed in a manner that bypasses layers at which the data need not be operated upon.

In one aspect of the present invention, the communication device operates to communicate data, alternately by way of a radio bearer configured in a first manner and by way of a radio bearer configured in a second manner. The radio bearer connection is configured in the first manner to require that the data that is operated upon by the communication device be acted upon by mid stack, protocol stack layers. And, the radio bearer is configured in the second manner to not require that the data be operated upon by all of the mid stack layers of the protocol stack defining the communication device. When a determination is made that the data has been, or is to be, communicated by way of the first radio bearer configuration, the data is routed through all of the logical layers of the protocol stack. If, however, a determination is made that the data has been, or is to be, communicated by way of the second radio bearer configuration, the data is routed in a manner so as to bypass one or more mid stack layers of the protocol stack of the communication device through which the data is routed.

A determiner is provided for determining whether the data has been, or is to be, communicated by way of the radio bearer configured in the first manner or by way of the radio bearer configured in the second manner. Responsive to the determination, the data is appropriately routed through the layers of the protocol stack of the communication device. The data bypasses one or more mid stack layers if the determiner determines communication of the data has been, or is to be, effectuated by way of the second radio bearer configuration.

In one implementation, a first radio bearer connection is configured to form a packet switched connection, and a second radio bearer connection is configured to form a circuit switched connection. When, for instance, the radio communication system forms a 3G UMTS (Third Generation Universal Mobile Telephone Service) communication system, operable pursuant to the operating specification defining the operational parameters of a 3G UMTS communication system, a bearer capability IE is generated. The values of the bearer capability IE are analyzed, and, responsive to the analysis, a determination is made by the determiner whether the data has been, or is to be, communicated by way of the packet switched connection or the circuit switched connection. Packet switched data, i.e., data that is communicated by way of a packet switched connection is applied to all of the logical layers of a communication device, while circuit switched data, i.e., data that is communicated by way of the circuit switched connection, need not be applied to all of the mid stack layers. Pursuant to operation of an embodiment of the present invention, therefore, when a determination is made that the data is circuit switched data, the data is instead bypassed from one or more of the mid stack layers.

The mid stack layers include, for instance, an RLC (Radio Link Control), an MAC (Medium Access Control) layer, and an RRC (Radio Resource Control) layer. The RLC and MAC layers are selectably bypassed when a determination is made that the data need not be applied to such layers. When, for instance, the data forms circuit switched data, application of the data to the layers is bypassed, and the data is directly communicated between upper and lower logical layers of the communication device.

The upper logical layer forms, for instance, an application layer at which application software is executed. And, for instance, the bottom logical layer forms a physical layer of the communication device. Data originated at the communication device for communication upon a radio bearer connection is originated at the application layer and is selectably routed, if necessary, through the mid stack layers of the device. Or, if a determination is made that the data need not be applied to the mid stack layers, the data is caused to bypass the mid stack layers and is, e.g., communicated directly between the application and physical layers. Data terminated at the communication device is routed, selectably, alternately through the mid stack layers or directly from the physical layer to the application layer, depending upon the manner by which the radio bearer is configured, e.g., to communicate circuit switched or packet switched data.

Because the data, when not required to be passed through the mid stack layers of the communication device, is bypassed directly between upper and lower layers of the communication device, lessened amounts of delay are introduced during communication of the data. And, through bypassing the mid stack layers of the communication device, processing required to operate upon the data at the mid stack layers is correspondingly also decreased.

In these and other aspects, therefore, apparatus, and an associated method, is provided for a data communication device operable in a radio communication system. A data communication device is selectably operable to communicate data by way of a radio bearer configured in a first manner and by way of a radio bearer configured in a second manner. The data communication device is defined in terms of a protocol stack in which the protocol stack has an upper layer, a lower layer, and at least a first mid stack layer positioned therebetween. Routing of the data between the upper layer and the lower layer is effectuated. A determiner is adapted to receive an indication at least of whether communication of the data is effectuated by way of the first radio bearer configuration or by way of the second bearer configuration. The determiner determines, responsive to the indications provided thereto, whether to route the data through the at least the first mid stack layer during operation of the data communication device to communicate the data. A data router selector is adapted to receive the indications of determinations made by the determiner. The data router selector is selectably operable alternately to select routing of the data through the at least the first mid stack layer when the value representative of the determination made by the data type determiner indicates communication of the data by way of the first radio bearer configuration. And, the data router alternately is selectably operable to route the data directly between the upper layer and the lower layer when the value representative of the determination made by the data type determiner indicates communication of the data by way of the second radio bearer configuration.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
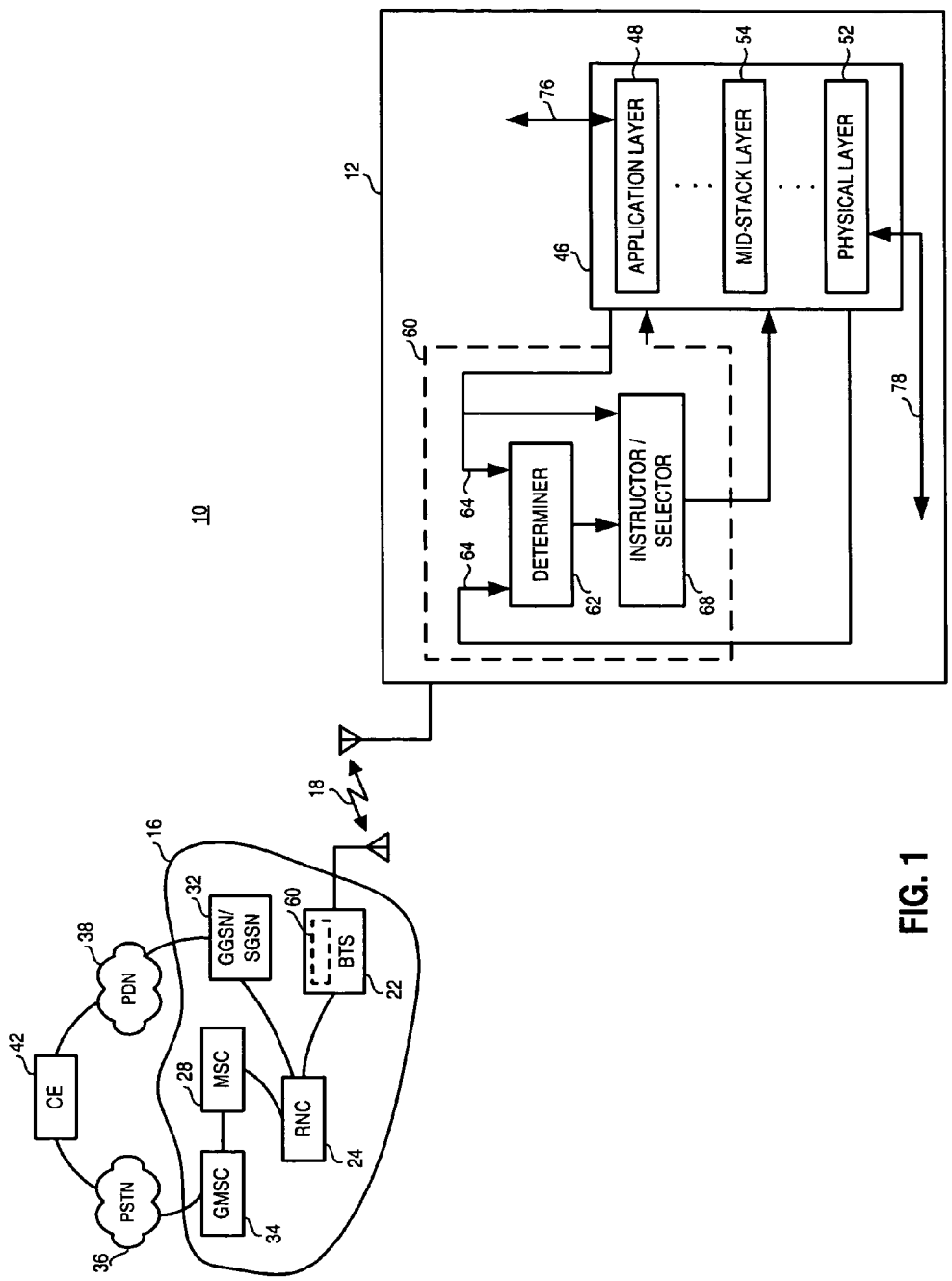
FIG. 1 illustrates a functional block diagram of a radio communication system that include communication devices operable pursuant to an embodiment of the present invention.

Referring first to FIG. 1, a radio communication system, shown generally at 10, forms a multi-user communication system permitting a plurality of communication sessions to be effectuated with a plurality of mobile stations, of which the mobile station 12 is representative. The radio communication system here forms a cellular communication system, operable generally pursuant to the operating protocol set forth in a 3G UMTS (Third Generation Universal Mobile Telephone Service) operating protocol. The communication system is exemplary and is also representative of cellular communication systems operable pursuant to other communication standards as well as other types of radio, and other, communication systems. While operation of an embodiment of the present invention shall be described with respect to its implementation in which the communication system forms a UMTS-compliant system, an embodiment of the present invention is analogously also implementable in other types of communication systems.

During operation of the communication system, data is communicated between a mobile station, such as the mobile station 12, and a network part of the communication system. Data is communicated during a communication session between the mobile station, also sometimes referred to herein as user equipment (UE), and network apparatus of the communication system.

The network of the communication system includes a UTRAN (UMTS Terrestrial Radio Access Network) part 16. The UTRAN part operates to provide a radio air interface access mechanism by which to provide for the effectuation of a communication session with the mobile station. Here, the arrow 18 represents communication channels defined upon a radio air interface extending between the UTRAN part and the user equipment formed of the mobile station.

The UTRAN part includes a base transceiver station (BTS) 22 that sends and receives data upon communication channels defined upon the radio air interface with the mobile station. The base transceiver station is coupled to a radio network controller (RNC) 24. The radio network controller operates, amongst other things, to control operation of the base transceiver station. The radio network controller, in turn, is coupled to a mobile switching center (MSC) 28 and a gateway GPRS (General Packet Radio Service) service node and serving GPRS service node (GGSN/SGSN) 32.

The mobile switching center is coupled, by way of a gateway mobile switching center (GMSC) 34 to an external network, here a PSTN (public switched telephonic network) 36. The GGSN/SGSN is coupled to a packet data network (PDN) 38. A correspondent entity (CE) 42 is represented to be coupled to the packet data network and the PSTN. The correspondent entity is representative of a communication source or communication target that communicates with the mobile station 12 during a communication session to effectuate a communication service. During a communication session, a communication path is formed between the correspondent entity and the mobile station to permit the communication of the data therebetween. A communication path is formed, for instance, by way of a selected one of the networks 36 and 38, the UTRAN part 16, and the radio air interface 18.

The elements of the communication system are sometimes also represented in terms of logical layers that together form a protocol stack. Different types of operations and data formatting operations are performed at the different layers of the protocol stack.

By way of an example, an exemplary protocol stack is shown at the mobile station 12. The protocol stack is formed of multiple layers, here including an upper layer 48, a lower layer 52, and mid stack layers 54 positioned therebetween. The upper layer 48 here forms an application layer, and the lower layer 52 here forms a physical (PHY) layer. Different elements of the communication system are defined in terms of different numbers of logical layers, and each of the elements can analogously be represented in terms of a protocol stack formed of one or more logical layers.

The mobile station is capable of communicating different data types. Here, in particular, the mobile station is capable of communicating circuit switched data and packet switched data. Circuit switched data, as used herein, refers to data that is communicated by way of a circuit switched connection, and packet switched data, as used herein, refers to data that is communicated by way of packet switched connections. In a circuit switched connection, generally, a dedicated channel is formed, to be used exclusively for the communication of the circuit switched data. In contrast, a packet switched connection is a shared connection, permitting more than one communication session to be effectuated upon a single channel. In a mobile station constructed to be compliant generally with the operating protocols of the 3G UMTS operating specification, different operations are performed upon the different data types, depending upon whether the data is to be communicated by way of a circuit switched connection or by way of a packet switched connection. For instance, when data is to be communicated by way of a circuit switched connection, operations performed by various ones of the mid stack layers of the protocol stack need not be performed upon the data. Performing the operations upon such data introduces communication delays in the data and requires power consumptive processing capacity that increases the computational complexity of the operations performed upon the data. The configuration of the radio bearer is determined, e.g., by the data type of the data that is to be communicated. The radio bearer is configured in a first manner when circuit-switched data is communicated and is configured in a second manner when packet switched data is communicated.

To facilitate communication of the data, the mobile station includes apparatus, shown generally at 60, of an embodiment of the present invention. The elements of the apparatus are functionally represented and can be implemented in any desired manner, such as by algorithms executable by processing circuitry. In the exemplary implementation, the functions performed by the apparatus 60 are provided, at least in part, at a non access stratum (NAS) layer of the protocol stack of which the mobile station is formed. The apparatus 60 is implementable, additionally, elsewhere in the communication system, such as at the base transceiver station 22.

The apparatus here includes a radio bearer configuration determiner 62 that is coupled to receive indications, here represented by way of the lines 64, of the data type of the data that is to be communicated or of the manner in which the radio bearer is configured. The indications are contained, for instance, in a bearer capability IE, such as that set forth in the TS24.008-360 operating specification document. The determiner determines the manner by which the radio bearer is configured. And, indications of the determinations made by the determiner are provided to a data router instructor and selector 68. The data router instructor operates, selectably, to apply the data that is communicated during operation of the mobile station (or elsewhere, when implemented elsewhere) to the mid stack layer, or layers 54, or directly between the application and physical layers 48 and 52. Here, when the determiner determines the radio bearer to be configured to communicate circuit switched data, the instructor and selector selects and causes the data to be communicated directly between the upper and lower layers. But, when the determiner determines the radio bearer to be configured to communicate packet switched data, the data router instructor operates to select and to cause the data to be applied to the mid stack layers. Data originated at the mobile station, here indicated by the line 76, is provided to the application layer and is routed, either to the mid stack layer, or directly to the physical layer. And, when data is delivered to the mobile station, indicated by the line 78, determinations are made by the determiner and the data is selectably also routed, alternately to the upper layer or the mid stack layer. Thereby, the data is caused to be routed through the mid stack layers only when operation of such mid stack layers is required.

Figure 2:
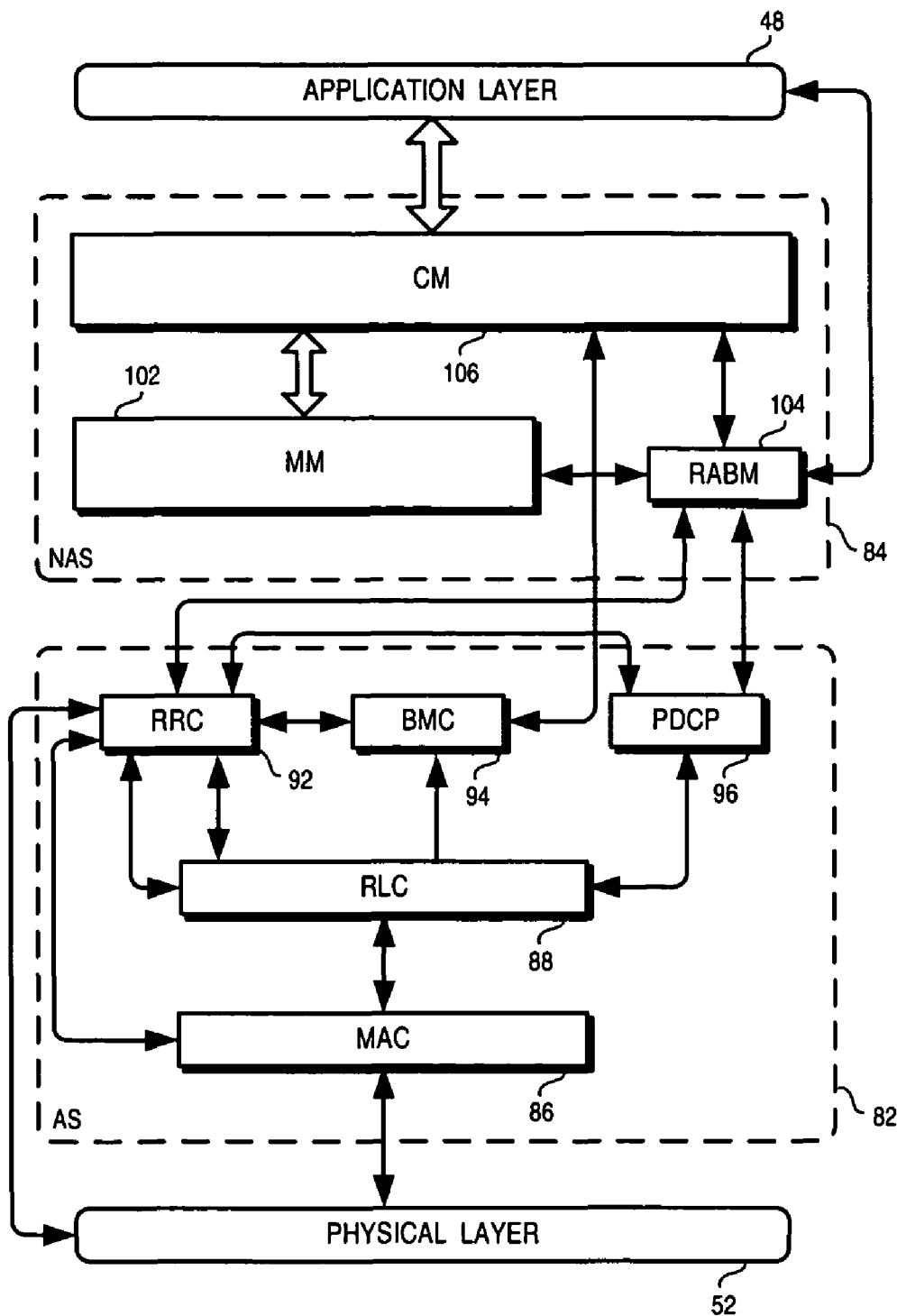
FIG. 2 illustrates a representation, in terms of logical layers, of a communication device that forms part of the radio communication system shown in FIG. 1.

FIG. 2 illustrates a representation of the protocol stack 46 defining the logical layers of the mobile station 12. Again, the top layer 48 here forms an application layer at which, e.g., voice and other application programs are executed. And, again, the lower layer forms a physical layer 52. The mid stack layers 54 are grouped in terms of an access stratum 82 and the non access stratum 84. As noted previously, in the exemplary implementation, the apparatus 60 is embodied at the non access stratum.

The access stratum is here shown to include a medium access control (MAC) layer 86, a radio link control (RLC) protocol layer 88, a radio resource control (RRC) protocol layer 92, a broadcast/multicast (BMC) layer 94, and a packet data convergence protocol (PDCP) layer 96. The logical layers of the non access stratum are here grouped in terms of a mobile management (MM) layer 102, a radio access bearer manager (RABM) layer 104, and connection management (CM) layer 106. During operation of the apparatus 60 (shown in FIG. 1), the data is caused selectably to be bypassed from the mid stack layers and communicated directly between the application layer 48 and a physical layer 52, or otherwise caused to bypass one or more of the mid stack layers.

Figure 3:
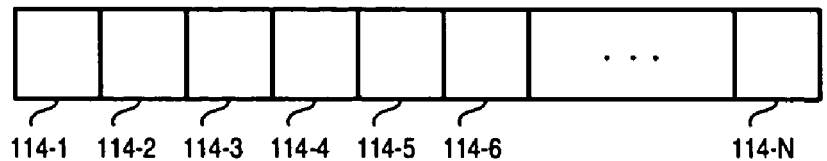
FIG. 3 illustrates a representation of a bearer capability IE responsive to which determinations of the data type of data are made during operation of an embodiment of the present invention.

FIG. 3 illustrates a representation, shown generally at a bearer capability IE 112, or a signal representative of such, that is provided the determiner 62, shown in FIG. 1, and responsive to which determinations are made by the determiner. The bearer capability IE is formatted into octets 114. A third octet of the signal 114-3 includes three bits, bits one, two, and three, that indicate the information transfer capability of the data. And, a sixth octet, 114-6, includes a bit, a first bit, that indicates the transmission type of the data. The data is communicated, alternately, to be asynchronous, or synchronous, transmission. The information contained in the bearer capability IE is provided to the physical, or other L1, layer by way of the RRC layer 92, shown in FIG. 2.

Also during operation of an embodiment of the present invention, new information is provided by the RRC layer to the L1 layer in a CPHY_TrChConfig_req signal. The additional information contained in the signal includes:
RAB_Type Information Transfer Capability Optional asynchronous Boolean optional.

Additionally pursuant to operation of an embodiment of the present invention, an information transfer capability is taken directly from the bearer capability IE in the form of the following data:
SYNTYPE Information TransferCapability
BIT_STRING Constants Size(3)
ENDSYNTYPE.

If the asynchronous parameter is present, but is set to false, then the transmission type is synchronous. If RAB_TYPE is present, then the asynchronous parameter must also be present and vice versa. That is to say, if the RAB_TYPE is not present, then the asynchronous must also not be present. The information is provided to the RRC layer 92 (shown in FIG. 2) from the non access stratum 84 (also shown in FIG. 2) in a signal RRC_RAB_INFO_REQ.

If a determination is made during operation of the apparatus 60 that a radio access bearer that is to be set up should bypass one or more mid stack layers, then the signal is sent to the radio resource control layer prior to sending by the UTRAN part 16, the RRC message to set up the radio access bearer. If the radio access bearer that is to be set up is to communicate data that is not to be bypassed from one or more of the mid stack layers, then the non access stratum need not send the signal.

The signal is sent by the non access stratum to the radio resource control layer if a radio bearer that is to be set up is to use anything other than default settings in which data is routed through the mid stack layers. One signal is sent for each radio access bearer that contains one or more new radio bearers that require non-default settings. Existing radio bearer connections in such radio access bearers are unaffected. The information is valid until a radio bearer set up message, creating at least one radio access bearer connection is successfully processed, or the mobile station transitions back to an idle mode.

A radio bearer set up may start to be processed, causing the non access stratum layer to be informed of a new radio access bearer connection but then may fail in which case the non access stratum should be informed of the removal of the radio access bearer connection. The non access stratum is not necessarily able to distinguish between the scenario for which the RRC_RAB_INFO_REQ shall remain valid and successful processing of the radio bearer set up followed by successful processing of a radio bearer release, for which the RRC_RAB_INFO_REQ will be discarded. If the radio bearer set up is successfully processed but does not set up a radio access bearer connection for which the RRC_RAB_INFO_REQ is received, then that RRC_RAB_INFO_REQ is discarded.

If a second RRC_RAB_INFO_REQ signal is received for a radio access bearer connection for which the RRC_RAB_INFO_REQ has already been received, and is still valid, the prior-transmitted signal is superseded.

Figure 4:
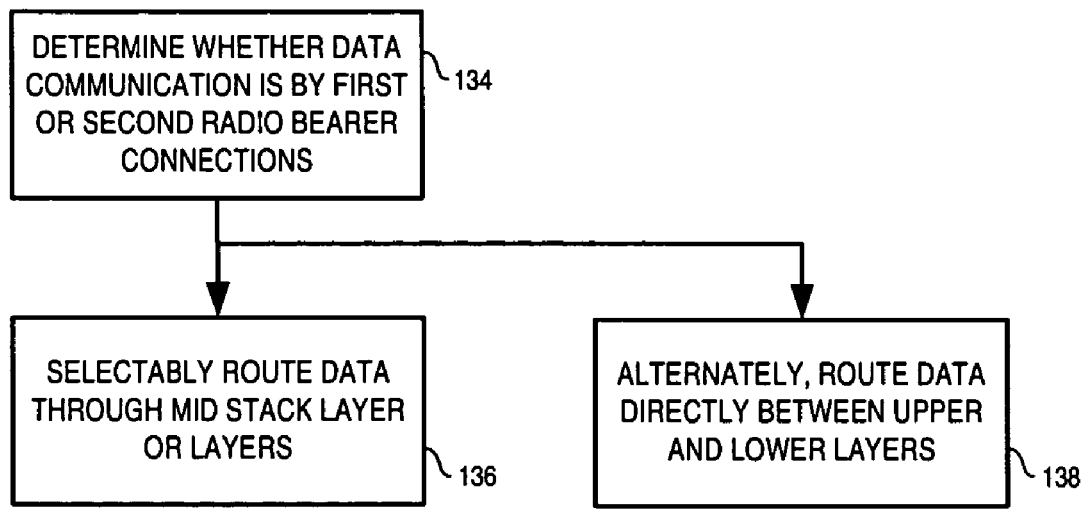
FIG. 4 illustrates a method flow diagram listing the method steps of the method of operation of an embodiment of the present invention.

FIG. 4 illustrates a method, shown generally at 132, representative of operation of an embodiment of the present invention by which to route data between an upper layer and a lower layer of a communication device. First, and as indicated by the block 134, a determination is made, responsive to an indication of at least whether communication of the data is effectuated by way of the first radio bearer configuration or the second radio bearer configuration of whether to route the data through the at least the first mid stack layer during operation during operation of the data communication device to communicate the data.

Then, and as indicated by the block 136, the data is selectably routed through at least the first mid stack layer when determination is made to route the data therethrough. Otherwise, and as indicated by the alternate block 138, the data is selectably routed directly between the upper level layer and the lower level layer.

Thereby, a manner is provided by which to route data through a communication device defined in terms of logical layers. When data need not be routed through mid stack layers of the protocol stack, the data is bypassed therefrom. And, if the data is to be applied to the mid stack layers, the data is routed therethrough.

The previous descriptions are of preferred examples for implementing the invention, and the scope of the invention should not necessarily be limited by this description. The scope of the present invention is defined by the following claims:

We claim:

1. An apparatus for a mobile station operable in a Universal Mobile Telephone Service (UMTS) cellular communication system, the mobile station selectably operable to communicate data by way of a radio bearer configured as a packet switched connection and by way of the radio bearer configured as a circuit switched connection, and the mobile station including a protocol stack, the protocol stack having an upper layer, a lower layer, and at least one mid-stack layer positioned between the upper layer and the lower layer, said apparatus for sending data between the upper layer and the lower layer, said apparatus comprising:

a radio bearer configuration determiner adapted to receive an indication of a radio bearer capability information element (IE), said radio bearer configuration determiner for determining, responsive to the indication of a radio bearer capability IE at least whether the radio bearer is configured as a packet switched connection or as a circuit switched connection, and also responsive to the indication of a radio bearer capability (IE) whether to select sending of the data through the at least one mid-stack layer during operation of the mobile station to communicate the data, where said at least one mid-stack layer comprises a Medium Access Control (MAC) layer and a Radio Link Control (RLC) layer; and a data sender instructor adapted to receive an indication of determination by said radio bearer configuration determiner, said data sender instructor configured to instruct sending of the data through the MAC layer and the RLC layer when the determination made by said radio bearer configuration determiner indicates configuration of the radio bearer as a packet switched connection, and, alternatively, to instruct sending of the data directly between the upper layer and the lower layer when the determination made by said radio bearer configuration determiner indicates configuration of the radio bearer as a circuit switched connection, wherein the MAC and RLC layer are bypassed.

2. The apparatus of claim 1 wherein said radio bearer configuration determiner is adapted to receive an indication of whether the radio bearer is configured in the packet switched connection or in the circuit switched connection, and is configured to determine whether communication of the data is effectuated by way of the packet switched connection or by way of the circuit switched connection.

3. The apparatus of claim 1 wherein, when the data is originated at the mobile station, said data sender instructor further instructs sending of the data directly from the upper layer to the lower layer.

4. The apparatus of claim 1 wherein, when the data is delivered to the mobile station, said data sender instructor further instructs sending of the data directly from the lower layer to the upper layer.

5. The apparatus of claim 1, wherein said radio bearer configuration determiner and said data sending instructor are embodied at the mobile station.

6. The apparatus of claim 5, wherein the upper layer forms an application layer, wherein the bottom layer forms a physical layer.

7. The apparatus of claim 6 wherein the mobile station further comprises a Non-Access Stratum (NAS) and wherein said radio bearer configuration determiner and said data sender instructor are logically embodied at the Non-Access stratum.

8. The apparatus of claim 6 wherein the indication of at least whether the communication of the data is effectuated by way of the radio bearer configured as a packet switched connection or the radio bearer configured as a circuit switched connection that said radio bearer configuration determiner is adapted to receive comprises a Bearer Capability IE in accordance with a Third Generation Universal Mobile Telephone Service system.

9. The apparatus of claim 8 wherein at least one radio bearer configuration as a packet switched connection comprises a synchronous connection and at least one radio bearer configuration as a circuit switched connection comprises an asynchronous connection and wherein said radio bearer configuration determiner is adapted to receive an indication of whether the radio bearer is configured in the synchronous connection or in the asynchronous connection.

10. The apparatus of claim 9 wherein the further determinations made by said radio bearer configuration determiner are further responsive to values of the Bearer Capability IE in accordance with a Third Generation Universal Mobile Telephone Service system.

11. The apparatus of claim 10, wherein determinations made by said radio bearer configuration determiner are provided to the Radio Resource Control layer.

12. The apparatus of claim 10 wherein, upon determination by said radio bearer configuration determiner that the data is to be sent directly between the application layer and the physical layer, this determination is provided to a Radio Resource Control layer.

13. A method of communicating by way of a mobile station operable in a Universal Mobile Telephone Service (UMTS) cellular communication system, the mobile station selectably operable to communicate data by way of a radio bearer configured as a packet switched connection and by way of a radio bearer configured as circuit switched connection, and the mobile station including a protocol stack, the protocol stack having an upper layer, a lower layer, and at least one mid-stack layer positioned between the upper layer and the lower layer, said method for sending the data between the upper layer and the lower layer, said method comprising:

determining, by the mobile station, responsive to an indication of a radio bearer capability information element (IE), of whether communication of the data is effectuated by way of the radio bearer configured as a packet switched connection or as a circuit switched connection, and of whether to select sending of the data through the at least one mid-stack layer during operation of the mobile station to communicate the data, where said at least one mid-stack layer comprises a Medium Access Control (MAC) layer and a Radio Link Control (RLC) layer;

instructing, by the mobile station, sending of the data through the MAC layer and the RLC layer when determination is made during said operation of determining to send the data through the at least one mid-stack layer; and, otherwise instructing, by the mobile station, sending of the data directly between the upper level layer and the lower level layer, wherein the MAC and RLC layer are bypassed.

14. The method of claim 13 wherein said operation of determining comprises determining, responsive to an indication of whether communication of the data is effectuated by way of a radio bearer configured in the packet switched connection or in the circuit switched connection, whether to select sending of the data through the at least one mid-stack layer.

15. The method of claim 13, wherein the upper layer forms an application layer, wherein the bottom layer forms a physical layer.

16. The method of claim 15 further comprising the operation, prior to said operation of determining, of detecting a Bearer Capability IE and wherein the indication, responsive to which said operation of determining is performed, is of values representative of selected values of the Bearer Capability IE.

17. The method of claim 13 wherein said operation of determining further comprises determining whether the radio bearer upon which the data is communicated is configured as a packet switched connection or as a circuit switched connection, comprises determining whether the radio bearer is configured as a synchronous channel or an asynchronous channel.

18. An apparatus for a mobile station operable in a Universal Mobile Telephone Service (UMTS) cellular communication system, the mobile station selectably operable to communicate data by way of a radio bearer configured as a packet switched connection and by way of the radio bearer configured as a circuit switched connection, and the mobile station including a protocol stack, the protocol stack having an upper layer, a lower layer, and at least one mid-stack layer positioned between the upper layer and the lower layer, said apparatus for sending the data between the upper layer and the lower layer, said apparatus comprising:

a radio bearer configuration determiner adapted to receive an indication of a radio bearer capability information element (IE), said radio bearer configuration determiner for determining, responsive to the indication of a radio bearer capability IE at least whether the radio bearer is configured as a packet switched connection or as a circuit switched connection, and also responsive to the indication of a radio bearer capability (IE) whether to select sending of the data through the at least one mid-stack layer during operation of the mobile station to communicate the data, where said at least one mid-stack layer comprises a Medium Access Control (MAC) layer and a Radio Link Control (RLC) layer; and a data sender instructor adapted to receive an indication of determination by said radio bearer configuration determiner, said data sender instructor configured to instruct sending of the data through the MAC layer and the RLC layer when the determination made by said radio bearer configuration determiner indicates configuration of the radio bearer as a packet switched connection, and, alternatively, to instruct sending of the data directly between the upper layer and the lower layer, bypassing the MAC and RLC layer, when the determination made by said radio bearer configuration determiner indicates configuration of the radio bearer as a circuit switched connection, wherein instruction to send the data directly between the upper and lower layers is made by an RRC (Radio Resource Control) message and instruction to send the data through the MAC layer and the RLC layer is made as a default setting.

* * * * *